(12) United States Patent
Fukui et al.

(10) Patent No.: US 9,103,338 B2
(45) Date of Patent: Aug. 11, 2015

(54) HYDRAULIC SYSTEM FOR AIRCRAFT ACTUATORS

(75) Inventors: Atsushi Fukui, Gifu (JP); Yasuyuki Shirai, Gifu (JP)

(73) Assignee: Nabtesco Corporation, Tokyo (JP)

( * ) Notice: Subject to any disclaimer, the term of this patent is extended or adjusted under 35 U.S.C. 154(b) by 13 days.

(21) Appl. No.: 13/114,849

(22) Filed: May 24, 2011

(65) Prior Publication Data

US 2011/0290353 A1 Dec. 1, 2011

(30) Foreign Application Priority Data

May 26, 2010 (JP) ................ 2010-120328

(51) Int. Cl.
| | |
|---|---|
| *B64C 13/42* | (2006.01) |
| *F04B 49/06* | (2006.01) |
| *B64C 13/40* | (2006.01) |
| *F15B 18/00* | (2006.01) |
| *F15B 20/00* | (2006.01) |

(52) U.S. Cl.
CPC ............... *F04B 49/06* (2013.01); *B64C 13/40* (2013.01); *F15B 18/00* (2013.01); *F15B 20/004* (2013.01); *F15B 2211/20515* (2013.01); *F15B 2211/20546* (2013.01); *F15B 2211/7054* (2013.01); *F15B 2211/864* (2013.01); *F15B 2211/8633* (2013.01); *F15B 2211/8636* (2013.01); *F15B 2211/8757* (2013.01); *Y02T 50/44* (2013.01)

(58) Field of Classification Search
CPC ........................................................ B64C 13/42
USPC ........................................ 244/227, 226, 99.6
See application file for complete search history.

(56) References Cited

U.S. PATENT DOCUMENTS

| 4,428,196 A * | 1/1984 | Boehringer ................ 60/403 |
| 7,600,715 B2 * | 10/2009 | Matsui ..................... 244/99.6 |
| 7,622,821 B2 * | 11/2009 | Mehrer et al. ................ 307/32 |

(Continued)

FOREIGN PATENT DOCUMENTS

| JP | 2002-310071 A | 10/2002 |
| JP | 2002-349513 A | 12/2002 |

(Continued)

OTHER PUBLICATIONS

An Office Action; "Notice of Reason for Rejection," issued by the Japanese Patent Office on Mar. 5, 2014, which corresponds to Japanese Patent Application No. 2010-120328 and is related to U.S. Appl. No. 13/114,849; with English language partial translation.

(Continued)

*Primary Examiner* — Justin Benedik
(74) *Attorney, Agent, or Firm* — Studebaker & Brackett PC

(57) ABSTRACT

An electric motor drives a variable capacity backup hydraulic pump that can supply pressure oil to an actuator when a loss or reduction occurs in the function of an aircraft central hydraulic power source. A power source unit rectifies electric power supplied from a variable frequency supply. A driver supplies the electric power from the power source unit, and drives the electric motor so as to rotate the pump at a predetermined constant rotational speed. The constant rotational speed is set, based on the change in the efficiency of each of the pump, the electric motor, and the driver with respect to the rotational speed of the pump, such that the overall efficiency, obtained as a product of these efficiencies, has a maximum value.

1 Claim, 4 Drawing Sheets

(56) References Cited

U.S. PATENT DOCUMENTS

2006/0151666 A1* 7/2006 VanderMey et al. .......... 244/12.3
2006/0226285 A1* 10/2006 Matsui .......................... 244/99.6
2009/0145998 A1* 6/2009 Salyer ......................... 244/17.23
2009/0242694 A1* 10/2009 Oyama ......................... 244/99.6
2009/0272110 A1* 11/2009 Matsui ............................ 60/451

FOREIGN PATENT DOCUMENTS

| JP | 2003-090288 A | | 3/2003 | |
| JP | 2006-233764 A | | 9/2006 | |
| JP | 2007-046790 | * | 2/2007 | .............. F15B 20/00 |
| JP | 2007-046790 A | | 2/2007 | |

OTHER PUBLICATIONS

An Office Action; "Notice of Reason for Rejection," issued by the Japanese Patent Office on Mar. 5, 2014, which corresponds to Japanese Patent Application No. 2010-120328 and is related to U.S. Appl. No. 13/114,849; with English language translation.

* cited by examiner

HYDRAULIC SYSTEM FOR AIRCRAFT ACTUATORS

CROSS-REFERENCE TO RELATED APPLICATIONS

This application claims priority to Japanese Patent Application No. 2010-120328. The entire disclosure of Japanese Patent Application No. 2010-120328 is hereby incorporated herein by reference.

BACKGROUND OF THE INVENTION

1. Field of the Invention

The present invention relates to a hydraulic system for aircraft actuators that includes a hydraulically operated actuator for driving a control surface of an aircraft and that supplies pressure oil to the actuator.

2. Description of Related Art

An aircraft is provided with control surfaces that are formed as moving surfaces (flight control surfaces) and are configured as an aileron, an elevator, and the like. A hydraulically operated actuator is often used as an actuator for driving such control surfaces. Further, pressure oil is supplied to such an actuator from an aircraft central hydraulic power source. However, a loss or reduction in the function (pressure oil supply function) of the aircraft central hydraulic power source may occur. To address this problem, JP 2007-46790A discloses a hydraulic system (hydraulic system for aircraft actuators) that can supply pressure oil to an actuator even if a loss or reduction in the function of the aircraft central hydraulic power source occurs.

The hydraulic system for aircraft actuators that is disclosed in JP 2007-46790A includes an actuator, a pump that is provided independently of the aircraft central hydraulic power source, and an electric motor. The pump is provided so as to raise the pressure of pressure oil that is discharged from the actuator and to supply the pressure oil to the actuator. The electric motor is configured to drive the pump when the aircraft central hydraulic power source undergoes a pressure decrease and a loss or reduction in its function occurs.

SUMMARY OF THE INVENTION

Even if a loss or reduction in the function of the aircraft central hydraulic power source of the aircraft occurs, the actuator can be driven by operating the pump of a hydraulic system for aircraft actuators as disclosed in JP 2007-46790A. However, in the case of a loss or reduction in the function of the aircraft central hydraulic power source, the pump and the electric motor for driving the pump of the above-described hydraulic system are continuously running. This tends to cause an increase in the overall temperature of the hydraulic system including the pump, the electric motor, and the driver that supplies electric power to the electric motor, and also tends to cause an increase in the temperature of the oil (working fluid) that is supplied as the pressure oil from the pump to the actuator and that is circulated between the pump and the actuator. Accordingly, there is a significant constraint on the continuous running time and the time for oil replacement associated with oil degradation.

In view of the foregoing circumstances, it is an object of the present invention to provide a hydraulic system for aircraft actuators that can drive the actuator even in the case of a loss or reduction in the function of the aircraft central hydraulic power source, and can suppress an increase in the overall temperature of the system and the temperature of the oil used.

According to a feature of a hydraulic apparatus for aircraft actuators of the present invention for achieving the above-described object, there is provided a hydraulic system for aircraft actuators that includes a hydraulically operated actuator for driving a control surface of an aircraft and that supplies pressure oil to the actuator, the system including: the actuator that is operated by pressure oil supplied from a aircraft central hydraulic power source, and that drives the control surface; a variable capacity backup hydraulic pump that can supply pressure oil to the actuator when a loss or reduction occurs in a function of the aircraft central hydraulic power source; an electric motor that drives the backup hydraulic pump; a power source unit that rectifies electric power supplied from a variable frequency supply, which is a generator whose power-supply frequency changes with a change in a rotational speed of a power generation engine installed in the aircraft; and a driver that controls electric power supplied from the power source unit, supplies the electric power to the electric motor, and drives the electric motor so as to rotate the backup hydraulic pump at a predetermined constant rotational speed, wherein the constant rotational speed is set, based on a change in the efficiency of each of the backup hydraulic pump, the electric motor, and the driver with respect to the rotational speed of the backup hydraulic pump, such that an overall efficiency, obtained as a product of multiplying the efficiency of the backup hydraulic pump, the efficiency of the electric motor, and the efficiency of the driver, has a maximum value. In addition, the hydraulic system for aircraft actuators having the above-described feature is configured such that when a loss of the function of the actuator occurs, the electric motor is not operated and the backup hydraulic pump is not activated (i.e., the pressure oil is not supplied from the backup hydraulic pump to the actuator).

With this configuration, even if a loss or reduction in the function of the aircraft central hydraulic power sources occurs, the actuator can be driven by the pressure oil supplied from the backup hydraulic pump of the hydraulic system. On the other hand, electric power that is to be supplied to the electric motor that drives the backup hydraulic pump is supplied from the variable frequency supply whose power-supply frequency changes with the change in the rotational speed of the power generation engine installed in the aircraft. The efficiency of the electric motor and the backup hydraulic pump changes significantly depending on the rotational speed, and the heat generated as a loss caused by driving these devices at any point other than their maximum efficiency point also depends on the operating conditions. That is, in a conventional hydraulic system, the heat generated in the electric motor and the backup hydraulic pump varies depending on the operating conditions, and therefore it is difficult to maintain an efficient operational status of the hydraulic system as a whole, which may lead to a temperature increase during operation.

However, with the hydraulic system having this configuration, the electric power from the variable frequency supply is rectified by the power source unit, and moreover, the driver drives the electric motor so as to rotate the backup hydraulic pump at a predetermined constant rotational speed. Also, the predetermined constant rotational speed is set, based on the change in the efficiency of each of the backup hydraulic pump, the electric motor, and the driver with respect to the rotational speed (number of revolution) of the backup hydraulic pump, such that the overall efficiency, obtained as a product of multiplying these efficiencies, has a maximum value. This makes it possible to maintain the most efficient operational status of the hydraulic system as a whole, including the backup hydraulic pump, the electric motor, and the driver, thus minimizing the energy loss caused by heat generation in the hydraulic system. Accordingly, it is possible to minimize the amount of heat generation in the hydraulic system, thus suppressing an increase in the overall temperature of the hydraulic system. As a result, it is also possible to suppress an increase in the temperature of the oil used in the hydraulic system. Therefore, with this configuration, it is possible to provide a hydraulic system for aircraft actuators that can drive the actuator even in the case of a loss or reduction in the function of the aircraft central hydraulic power source, and can suppress an increase in the overall temperature of the system and the temperature of the oil used. In addition, in a hydraulic system having this configuration, the backup hydraulic pump is configured as a variable capacity hydraulic pump, and therefore the pressure of the pressure oil supplied to the actuator can be controlled by changing the capacity of the backup hydraulic pump, even when the backup hydraulic pump is rotated a predetermined constant rotational speed.

It should be appreciated that the above and other objects, and features and advantages of the present invention will become apparent from the following description taken in conjunction with the accompanying drawings.

DETAILED DESCRIPTION OF THE INVENTION

Hereinafter, an embodiment for carrying out the present invention will be described with reference to the accompanying drawings. It should be appreciated that an embodiment of the present invention can be widely applied as a hydraulic system for aircraft actuators that includes a hydraulically operated actuator for driving a control surface of an aircraft and that supplies pressure oil to the actuator.

Figure 1:
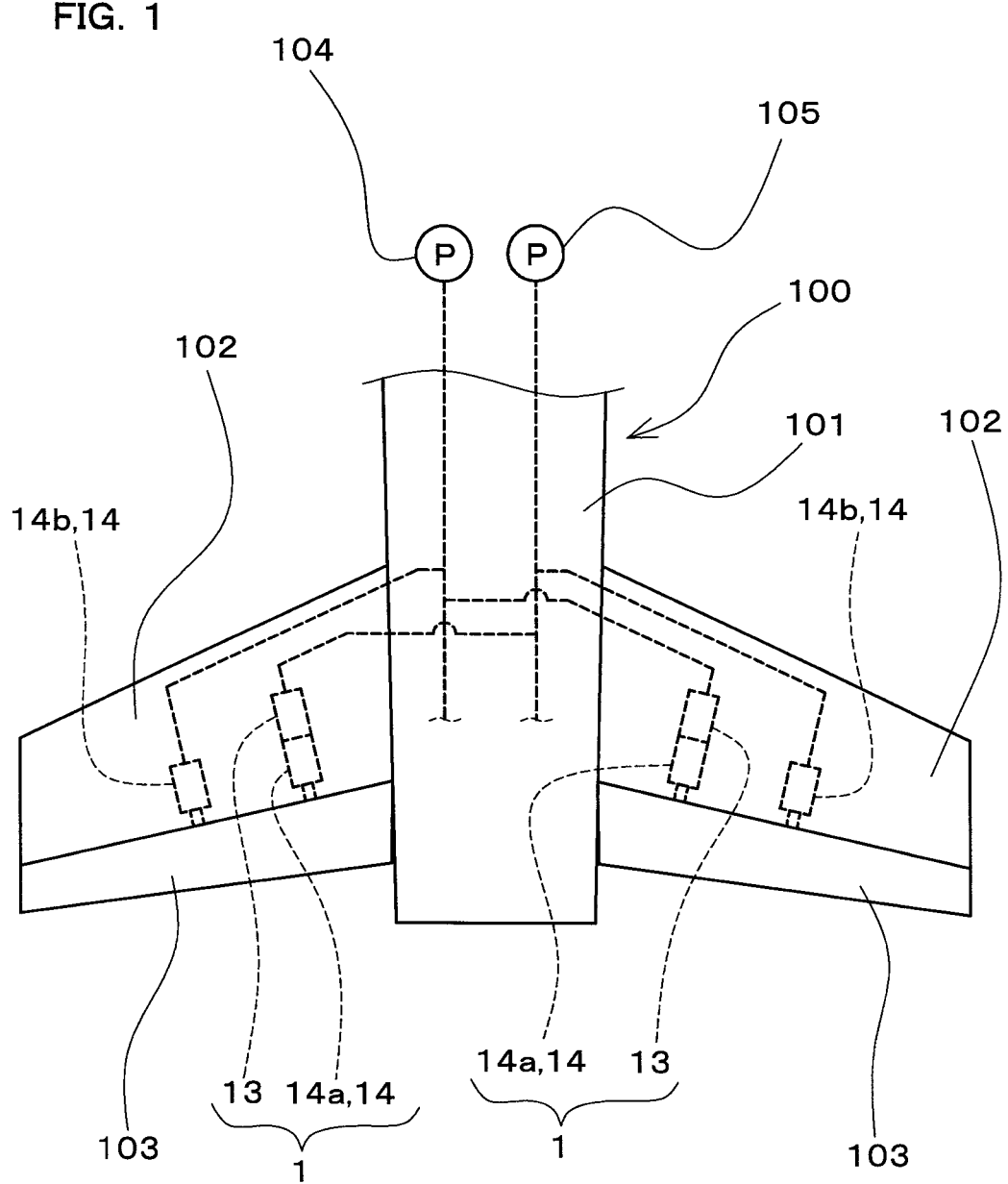
FIG. 1 is a diagram schematically showing part of an aircraft to which a hydraulic system for aircraft actuators according to an embodiment of the present invention is applied.

FIG. 1 is a diagram schematically showing part of an aircraft 100 to which a hydraulic system 1 for aircraft actuators (hereinafter, also simply referred to as a "hydraulic system 1") according to an embodiment of the present invention is applied, showing a rear part of a body 101 of the aircraft 100 and a pair of tailplanes (102). In FIG. 1, illustration of a vertical tail at the rear part of the body 101 is omitted.

Each of the two tailplanes (102) is provided with an elevator 103 as a moving surface (flight control surface) constituting a control surface of the aircraft 100. The elevator 103 of each tailplane 102 is configured to be driven by a plurality of (for example, two) actuators 14 (14a, 14b), as illustrated in FIG. 1. Actuators (14a, 14b) for driving elevators 103 and a hydraulic apparatus 13 configured to supply pressure oil to one of the actuators, namely the actuator 14a, are installed inside each tailplane 102. The hydraulic system 1 according to this embodiment includes the actuator 14a and the hydraulic apparatus 13.

In this embodiment, the actuators (14a, 14b) and the hydraulic apparatuses 13 that are respectively installed in the pair of tailplanes (102) are configured in the same manner, and the hydraulic systems 1 that are respectively installed in the tailplanes 102 are also configured in the same manner. Therefore, in the following description, the actuators (14a, 14b) and the hydraulic apparatus 13 that are installed in one of the tailplanes 102, and the hydraulic system 1 that includes the actuator 14a and the hydraulic apparatus 13 will be described. The description of the actuators (14a, 14b) and the hydraulic apparatus 13 installed in the other tailplane 102, and the hydraulic system 1 that includes the actuator 14a and the hydraulic apparatus 13 is omitted.

Figure 2:
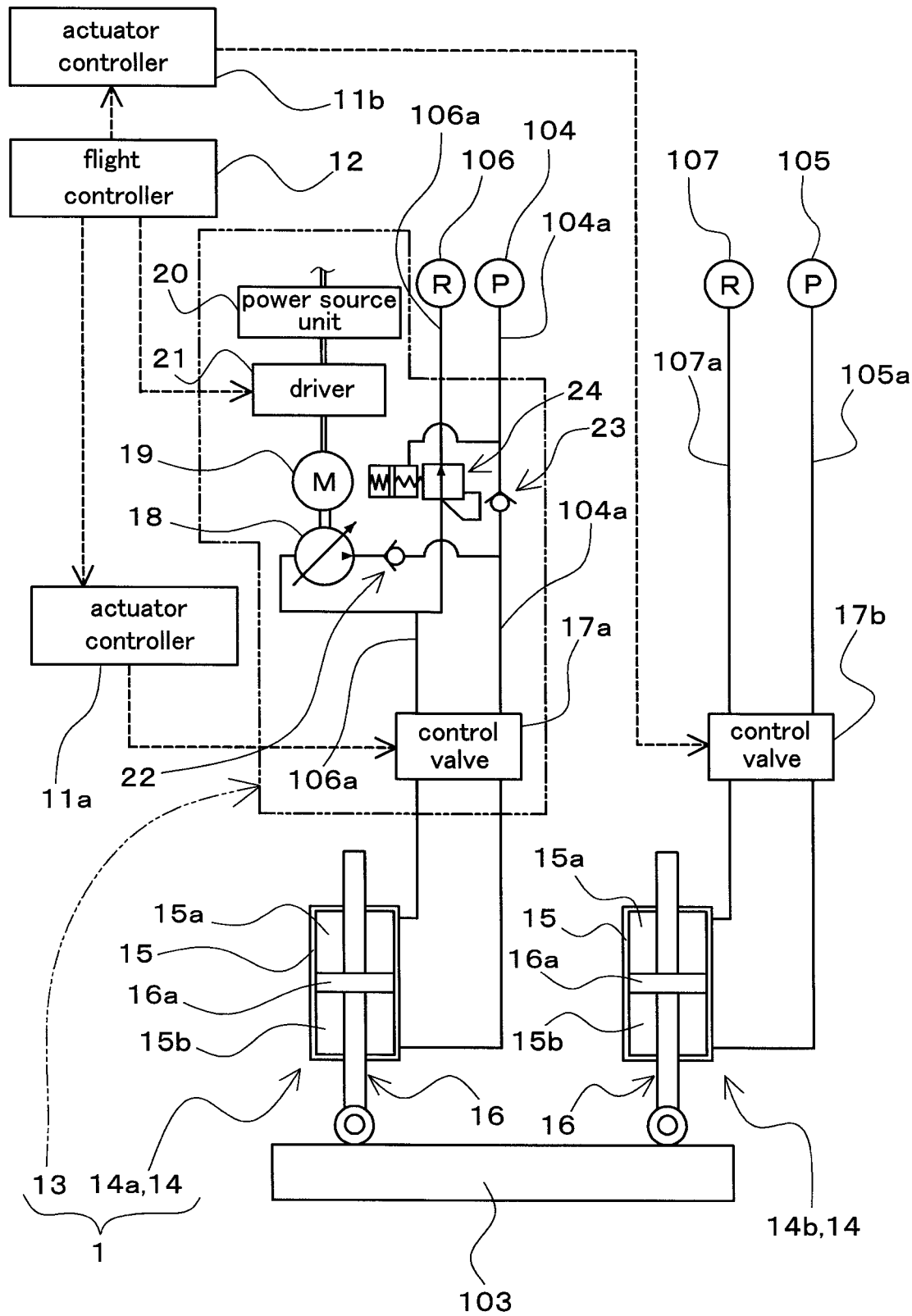
FIG. 2 is a hydraulic circuit diagram schematically showing a hydraulic circuit including a hydraulic system as shown in FIG. 1.

FIG. 2 is a hydraulic circuit diagram schematically showing a hydraulic circuit including a hydraulic system 1. FIG. 2 is shown as a hydraulic circuit diagram schematically showing a hydraulic circuit including the actuators (14a, 14b) for driving an elevator 103 provided in one of the tailplanes 102 and a hydraulic apparatus 13 configured to supply pressure oil to one of the actuators, namely the actuator 14a.

As shown in FIG. 2, each of the actuators (14a, 14b) includes, for example, a cylinder 15 and a rod 16 provided with a piston 16a, with the interior of the cylinder 15 divided into two oil chambers (15a, 15b) by the piston 16a. Also, each of the oil chambers (15a, 15b) in the cylinder 15 of the actuator 14a is configured to be in communication with a first aircraft central hydraulic power source 104 and a reservoir circuit 106 via a control valve 17a included in the hydraulic apparatus 13, which will be described later. On the other hand, each of the oil chambers (15a, 15b) in the cylinder 15 of the actuator 14b is configured to be in communication with a second aircraft central hydraulic power source 105 and a reservoir circuit 107 via a control valve 17b.

The first aircraft central hydraulic power source 104 and the second aircraft central hydraulic power source 105 are provided as aircraft central hydraulic power sources, which each include a hydraulic pump that supplies pressure oil, and are installed on the body 101 side (inside the body 101) as systems that are independent of each other. By supplying the pressure oil from the first and second aircraft central hydraulic power sources (104, 105), the actuators 14 for driving the elevator 103 and actuators (not shown) for driving control surfaces other than the elevator 103 are operated. Further, the first aircraft central hydraulic power source 104 is connected with the actuators 14 so as to be able to supply pressure oil to the actuator 14a installed in one of the tailplanes 102 and the actuator 14b installed in the other tailplane 102. On the other hand, the second aircraft central hydraulic power source 105 is connected with the actuators 14 so as to be able to supply pressure oil to the actuator 14b installed in one of the tailplanes 102 and the actuator 14a installed in the other tailplane 102.

The reservoir circuit 106 includes a tank (not shown) into which oil (working fluid) that is supplied as pressure oil and is thereafter discharged from the actuators 14 flows back, and the reservoir circuit 106 is configured to be in communication with the first aircraft central hydraulic power source 104. The reservoir circuit 107 that is configured as a system independent of the reservoir circuit 106 includes a tank (not shown) into which oil (working fluid) that is supplied as pressure oil and is thereafter discharged from the actuators 14 flows back, and the reservoir circuit 107 is configured to be in communication with the second aircraft central hydraulic power source 105 that is configured as a system independent of the first aircraft central hydraulic power source 104. Note that the reservoir circuit 106 is connected with the actuator 14a installed in one of the tailplanes 102 and the actuator 14b installed in the other tailplane 102, and is also connected with the first aircraft central hydraulic power source 104. Consequently, the pressure of the oil that has returned to the reservoir circuit 106 is raised by the first aircraft central hydraulic power source 104 and is supplied to predetermined actuators 14. On the other hand, the reservoir circuit 107 is connected with the actuator 14b installed in one of the tailplanes 102 and the actuator 14a installed in the other tailplane 102, and is also connected with the second aircraft central hydraulic power source 105. Consequently, the pressure of the oil that has returned to the reservoir circuit 107 is raised by the second aircraft central hydraulic power source 105 and is supplied to predetermined actuators 14.

The control valve 17a is provided as a valve mechanism that switches the state of connection of the oil chambers (15a, 15b) of the actuator 14a with a supply passage 104a in communication with the first aircraft central hydraulic power source 104 and an exhaust passage 106a in communication with the reservoir circuit 106. The control valve 17b is provided as a valve mechanism that switches the state of connection of the oil chambers (15a, 15b) of the actuator 14b with a supply passage 105a in communication with the second aircraft central hydraulic power source 105 and an exhaust passage 107a in communication with the reservoir circuit 107. The control valve 17a may be configured, for example, as an electromagnetic switching valve, and may be driven in accordance with a command signal from an actuator controller 11a that controls operation of the actuator 14a. The control valve 17b may be configured, for example, as an electromagnetic switching valve, and may be driven in accordance with a command signal from an actuator controller 11b that controls operation of the actuator 14b.

The actuator controller 11a controls the actuator 14a in accordance with a command signal from a flight controller 12 serving as a superordinate computer that commands operation of the elevator 103. The actuator controller 11b controls the actuator 14b in accordance with a command signal from the flight controller 12. The flight controller 12 may include, for example, a CPU (Central Processing Unit), a memory, an interface and the like, which are not shown, and is configured to control the operation of the elevator 103, which is shown as an example of the control surface in this embodiment, via the actuator controller 11a and the actuator controller 11b.

In addition, the actuator controller 11a and the actuator controller 11b may be installed, for example, as controllers of a centralized control system, or controllers of a distributed processing system. In the case of the centralized control system, the actuator controller 11a and the actuator controller 11b are installed in a single casing (not shown) installed on the body 101 side, and the system is configured such that the actuator controller 11a controls the actuator 14a and the actuator controller 11b controls the actuator 14b. In the case of the distributed processing system, the actuator controller 11a is installed in a casing (not shown) mounted to the actuator 14a and the actuator controller 11b is installed in a casing (not shown) mounted to the actuator 14b, and the system is configured such that the actuator controller 11a controls the actuator 14a and the actuator controller 11b controls the actuator 14b. Although this embodiment has been described taking, as an example, a configuration in which command signals from a single flight controller 12 are input into a plurality of different actuator controllers (11a, 11b), this need not be the case. For example, it is possible to adopt a configuration in which a plurality of command signals from different flight controllers are respectively input into different actuator controllers (11a, 11b).

Further, the above-described control valve 17a is switched in accordance with a command from the actuator controller 11a, and thereby pressure oil is supplied from the supply passage 104a to one of the oil chambers (15a, 15b) and the oil is discharged from the other of the oil chambers (15a, 15b) to the exhaust passage 106a. Consequently, the rod 16 is displaced relative to the cylinder 15, thus driving the elevator 103. Although not shown, a mode switching valve that switches the state (mode) of communication between the oil chambers (15a, 15b) is provided between the control valve 17a and the actuator 14a. Note that the control valve 17b is configured in the same manner as the control valve 17a described above, and therefore the description thereof is omitted.

Next, the hydraulic apparatus 13 of the hydraulic system 1 will be described in detail. The hydraulic apparatus 13 shown in FIGS. 1 and 2 is configured to supply pressure oil to the hydraulically operated actuator 14a for driving the elevator 103. Also, the hydraulic apparatus 13 is installed inside the tailplane 102. Although this embodiment is described, taking, as an example, a configuration of the hydraulic system 1 in which the hydraulic apparatus 13 supplies pressure oil to the actuator 14a for driving a control surface configured as the elevator 103, this need not be the case. That is, it is possible to implement a hydraulic system configured such that the hydraulic apparatus 13 supplies pressure oil to an actuator for driving a control surface other than an elevator, such as an aileron.

Figure 3:
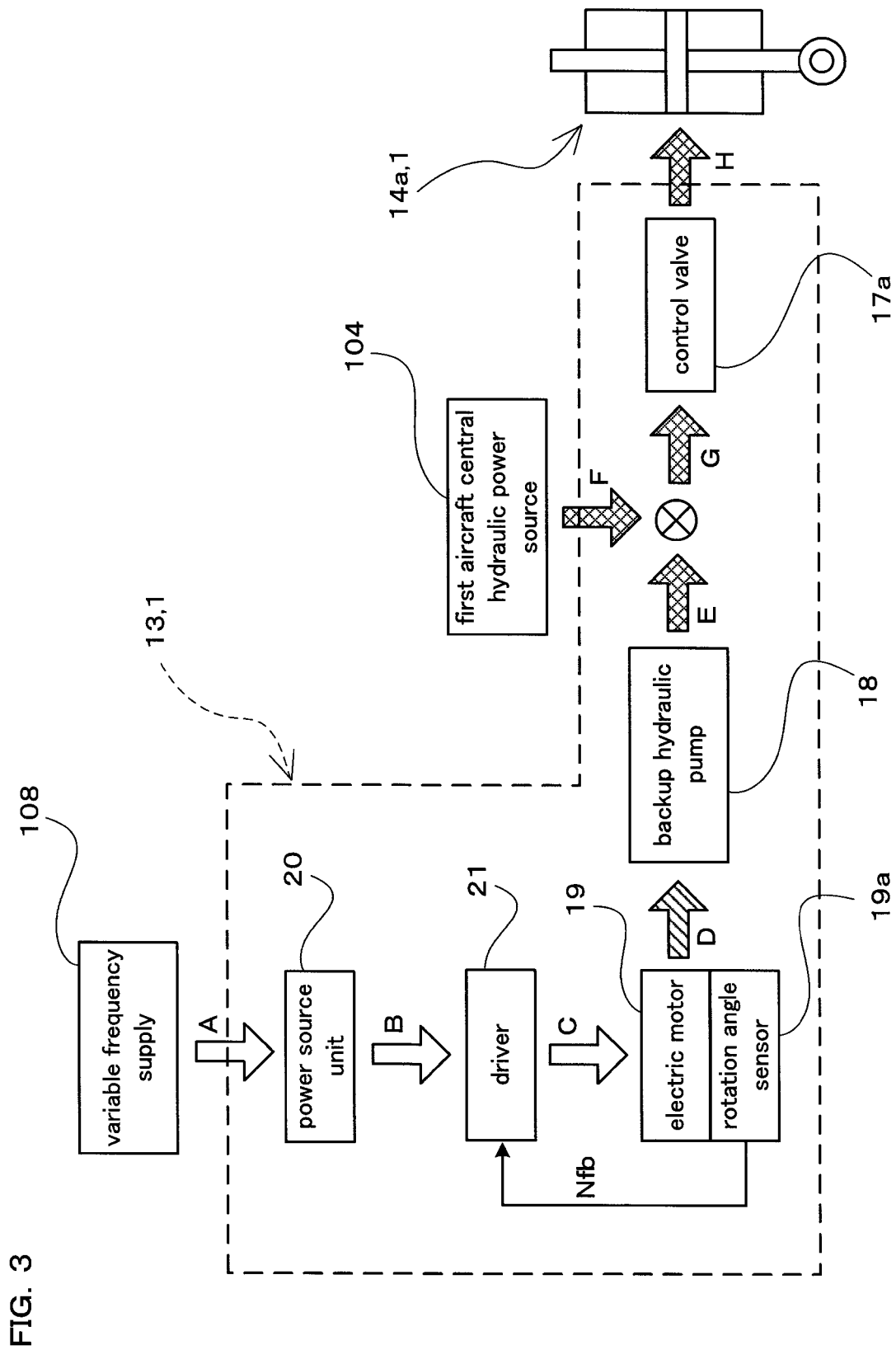
FIG. 3 is a block diagram schematically showing the hydraulic system for aircraft actuators shown in FIG. 1.

FIG. 3 is a block diagram schematically showing the hydraulic system 1. The hydraulic apparatus 13 shown in FIGS. 1 to 3 includes the control valve 17a, a backup hydraulic pump 18, an electric motor 19, a power source unit 20, a driver 21, and so forth. In FIG. 3, a variable frequency supply 108, which is a power supply source in the aircraft 100 and supplies electric power also to the hydraulic apparatus 13, and the above-described first aircraft central hydraulic power source 104 are also shown schematically.

In FIG. 3, the supply paths of electric power are indicated by the arrows (A, B, C), which are open white arrows outlined by a solid line. Namely, the electric power supply path from the variable frequency supply 108 to the power source unit 20 is indicated by the arrow A, the electric power supply path from the power source unit 20 to the driver 21 is indicated by the arrow B, and the electric power supply path from the driver 21 to the electric motor 19 is indicated by the arrow C. Additionally, in FIG. 3, the transmission path of mechanical power between the electric motor 19 and the backup hydraulic pump 18 via a coupling or the like (not shown) is indicated by the arrow D, which is an diagonally hatched arrow outlined by a solid line. Further, in FIG. 3, the supply paths of the pressure oil supplied from the first aircraft central hydraulic power source 104 and the backup hydraulic pump 18 to the actuator 14a are indicated by the arrows (E, F, G, H), which are cross-hatched arrows outlined by a solid line. Namely, the pressure oil supply path only from the backup hydraulic pump 18 is indicated by the arrow E, the pressure oil supply path only from the first aircraft central hydraulic power source 104 is indicated by the arrow F, the common pressure oil supply path from both of the backup hydraulic pump 18 and the first aircraft central hydraulic power source 104 to the control valve 17a is indicated by the arrow G, and the pressure oil supply path from the control valve 17a to the actuator 14a is indicated by the arrow H.

The backup hydraulic pump 18 shown in FIGS. 2 and 3 is configured as a variable capacity hydraulic pump including a swash plate. The suction side of the backup hydraulic pump 18 is connected in communication with the exhaust passage 106a, and its discharge side is connected in communication with the supply passage 104a via a check valve 22 so as to be able to supply pressure oil to the supply passage 104a. Further, the backup hydraulic pump 18 is provided as a hydraulic pump that can supply pressure oil to the actuator 14*a* at the occurrence of a loss or reduction in the function (pressure oil supply function) of the first aircraft central hydraulic power source 104 due to a failure of the hydraulic pump, oil leakage, and the like in the first aircraft central hydraulic power source 104.

A check valve 23 that permits flow of pressure oil into the actuator 14*a* and regulates flow of the oil in the opposite direction is provided upstream (on the first aircraft central hydraulic power source 104 side) of a location of the supply passage 104*a* where the discharge side of the backup hydraulic pump 18 is connected. Further, a relief valve 24 that discharges pressure oil into the reservoir circuit 106 when the pressure of the oil discharged from the actuator 14*a* rises is provided downstream (on the reservoir circuit 106 side) of a location of the exhaust passage 106*a* where the suction side of the backup hydraulic pump 18 is connected. Also, the relief valve 24 is provided with a pilot pressure chamber that is in communication with the supply passage 104*a* and in which a spring is installed. When the pressure of the pressure oil supplied from the supply passage 104*a* decreases below a predetermined pressure value, the pressure of the pressure oil being supplied as a pilot pressure oil to the pilot pressure chamber (pilot pressure) from the supply passage 104*a* also decreases below a predetermined pressure value, as a result of which the exhaust passage 106*a* is blocked by the relief valve 24. In the case of a loss or reduction in the function of the first aircraft central hydraulic power source 104, the provision of the above-described check valves (22, 23) and the relief valve 24 allows the pressure of the oil discharged from the actuator 14*a* to be raised by the backup hydraulic pump 18 without the oil returning to the reservoir circuit 106, and the pressure oil with an increased pressure is supplied to the actuator 14*a*.

As described above, the backup hydraulic pump 18 is configured as a variable capacity hydraulic pump. Accordingly, as will be described later, the backup hydraulic pump 18 is configured such that the pressure of the pressure oil supplied to the actuator 14*a* can be controlled by changing the capacity of the backup hydraulic pump 18 by changing the angle of the swash plate, even when the backup hydraulic pump 18 is rotated at a predetermined constant rotational speed.

The electric motor 19 shown in FIGS. 2 and 3 is coupled to the backup hydraulic pump 18 via a coupling (not shown), and is configured to drive the backup hydraulic pump 18. The electric motor 19 may be configured, for example, as a brushless motor. The operational status of the electric motor 19 is controlled via a driver 21, which will be described later, in accordance with a command signal from the flight controller 12 serving as a superordinate computer that commands operation of the elevator 103. Further, the electric motor 19 is provided with a rotation angle sensor 19*a* that detects the rotational speed (number of revolution) of the electric motor 19. The rotation angle sensor 19*a* may be configured, for example, by a rotary encoder, a resolver, or a tacho generator.

The flight controller 12 is connected to a pressure sensor (not shown) that detects the discharge pressure of the first aircraft central hydraulic power source 104 or the pressure of pressure oil passing through the supply passage 104*a* such that a pressure detection signal detected by the pressure sensor is input into the flight controller 12. Also, the flight controller 12 is configured to detect a loss or reduction in the function of the first aircraft central hydraulic power source 104 in accordance with the above-described pressure detection signal.

For example, the flight controller 12 may be configured to detect a reduction of the function of the first aircraft central hydraulic power source 104 according to the timing at which the pressure value of the pressure detection signal becomes equal to or less than a predetermined first pressure value, and detect a loss of the function of the first aircraft central hydraulic power source 104 according to the timing at which the pressure value of the pressure detection signal becomes equal to or less than a predetermined second pressure value that is smaller than the first pressure value. When a loss or reduction in the function of the first aircraft central hydraulic power source 104 is detected by the flight controller 12, the electric motor 19 is started to operate in accordance with a command signal from the flight controller 12, as a result of which pressure oil is supplied to the actuator 14*a* as described above. Furthermore, the electric motor 19 may be started in accordance with a signal from the flight controller 12, for example, in a stage when the aircraft is placed in a landing attitude, regardless of the pressure detection signal. This can ensure a safe flight even if a sudden loss or reduction of the function of the first aircraft central hydraulic power source 104 occurs in the landing stage, since the electric motor 19 is already in operation.

The power source unit 20 shown in FIGS. 2 and 3 is provided as a rectifier (converter) that rectifies the electric power supplied from the above-described variable frequency supply 108, which is an AC power supply. That is, the power source unit 20 is configured to convert the AC electric power of the variable frequency supply 108 into DC electric power. Note that the variable frequency supply 108 is configured as a generator whose power-supply frequency changes with the change in the rotational speed of a power generation engine (not shown) installed in the aircraft 100.

The driver 21 shown in FIGS. 2 and 3 is configured to control, in accordance with a command signal from the flight controller 12, the electric power supplied from the power source unit 20, supply the electric power to the electric motor 19, and control the rotational speed (number of revolution) of the electric motor 21 to drive the electric motor 21. Further, the driver 21 is configured such that a detection signal Nfb (the signal indicated by the arrow Nfb in FIG. 3) relating to the rotational speed of the electric motor 19 that has been detected by the rotation angle sensor 19*a* is input into the driver 21. The driver 21 is also configured to perform, in accordance with the command signal transmitted from the flight controller 12 and the detection signal Nfb, a feedback control of the speed of the electric motor 19 such that the electric motor 19 is rotated at a predetermined constant rotational speed. Accordingly, the driver 21 is configured to drive the electric motor 19 such that the backup hydraulic pump 18, which rotates in synchronization with the electric motor 19 via a coupling, is rotated at a predetermined constant rotational speed.

Figure 4:
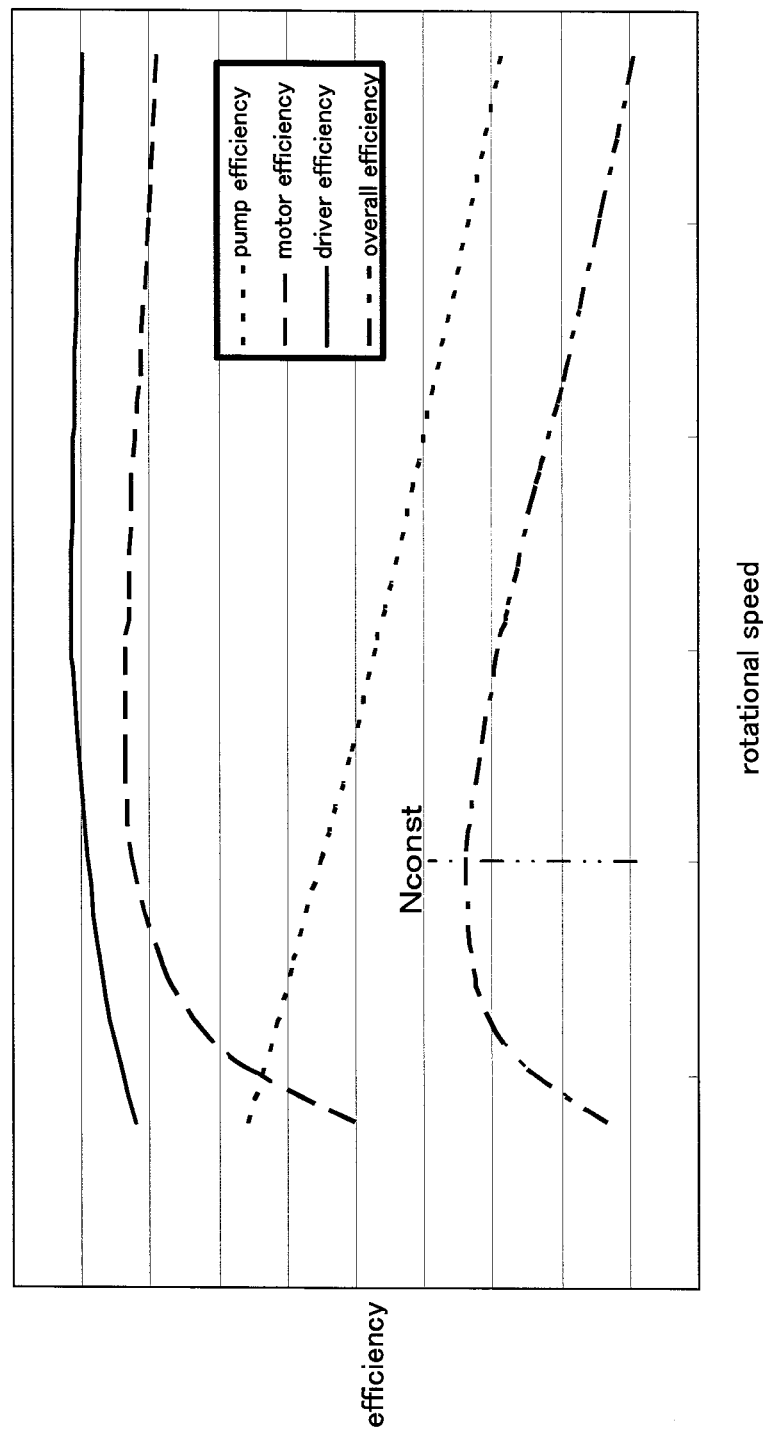
FIG. 4 is a diagram graph for illustrating the efficiency of the hydraulic system for aircraft actuators shown in FIG. 1.

FIG. 4 is a graph for illustrating the efficiency of the hydraulic system 1, showing the efficiency of each of the backup hydraulic pump 18, the electric motor 19, and the driver 21 with respect to the rotational speed of the backup hydraulic pump 18. In FIG. 4, the change in the efficiency of the backup hydraulic pump 18 with respect to the rotational speed thereof (pump efficiency) is indicated by a dashed line with a small pitch. In FIG. 4, the change in the efficiency of the electric motor 19 with respect to the rotational speed of the backup hydraulic pump 18 (motor efficiency) is indicated by a dashed line with a pitch larger than that of the dashed line indicating the change in the pump efficiency. In FIG. 4, the change in the efficiency of the driver 21 with respect to the rotational speed of the backup hydraulic pump 18 (driver efficiency) is indicated by a solid line. In FIG. 4, the change in the overall efficiency, obtained as a product of multiplying the efficiency of the backup hydraulic pump 18, the efficiency of the electric motor 19 and the efficiency of the driver 21 (i.e., "Overall efficiency"="Pump efficiency"×"Motor efficiency"×"Driver efficiency") (the change in the overall efficiency with respect to the rotational speed of the backup hydraulic pump 18) is indicated by an alternate long and short dash line. Further, FIG. 4 is shown as a schematic graph from which specific values of the efficiency and the rotational speed are omitted.

As shown in FIG. 4, the overall efficiency, which changes with respect to the rotational speed of the backup hydraulic pump 18, has a maximum value when the rotational speed is Nconst (the rotational speed indicated by the two-dot chain line Nconst in FIG. 4). Also, the above-described predetermined constant rotational speed when the driver 21 rotationally drives the backup hydraulic pump 18 is set at Nconst. That is, in the hydraulic system 1, the predetermined constant rotational speed is set at Nconst, based on the change in the efficiency of each of the backup hydraulic pump 18, the electric motor 19, and the driver 21 with respect to the rotational speed of the backup hydraulic pump 18, such that the above-described overall efficiency has a maximum value.

In this embodiment, a configuration is shown in which the electric motor 19 is configured as a brushless motor as an example. In this configuration, the driver 21 may be provided, for example, as an electronic circuit that performs a control in which the direct current from the power source unit 20 flows while being successively switched with respect to the phases of the stator coil of the electric motor 19. Note that the electric motor 19 may be configured as a brushed DC motor, or may be configured as an AC motor such as an induction motor or a synchronous motor. When the electric motor 19 is configured as a brushed DC motor, the driver 21 may be provided, for example, as an electronic circuit that drives the electric motor 19 so as to be driven at a constant rotational speed (Nconst) by changing the drive voltage of the electric motor 19. When the electric motor 19 is configured as an AC motor such as an induction motor or a synchronous motor, the driver 21 may be provided, for example, as an inverter circuit that drives the electric motor 19 so as to be rotated at a constant rotational speed (Nconst) by changing the frequency of the rotating magnetic field of the electric motor 19.

Next, an operation of the hydraulic system 1 will be described. Note that the operation of the hydraulic system 1 will be described only for the hydraulic system 1 connected with the first aircraft central hydraulic power source 104 and the operation of the hydraulic system 1 connected with the second aircraft central hydraulic power source 105 is the same as this and thus is omitted, as with the description of the above configuration of the hydraulic system 1.

In a state where a loss or reduction in the function of the first aircraft central hydraulic power source 104 has not occurred, the backup hydraulic pump 18 is not operated. In this state, the pressure oil from the first aircraft central hydraulic power source 104 is supplied to one of the oil chambers (15a, 15b) of the actuator 14a via the control valve 17a. The oil is discharged from the other of the oil chambers (15a, 15b) and is returned to the reservoir circuit 106 via the control valve 17a. Further, switching between the oil chambers (15a, 15b) to which pressure oil is supplied and from which the oil is discharged is performed by switching the state of connection of the control valve 17a in accordance with a command signal from the actuator controller 11a, as a result of which the actuator 14a is operated to drive the elevator 103.

On the other hand, when a loss or reduction in the function of the first aircraft central hydraulic power source 104 occurs, the electric motor 19 is started to operate by the electric power that is supplied from the variable frequency supply 108, then rectified by the power source unit 20, and then supplied via the driver 21, in accordance with a command signal from the flight controller 12, thus activating the backup hydraulic pump 18 and starting its operation. Then, the electric motor 19 is driven so as to rotate at a predetermined constant rotational speed (Nconst) under control of the driver 21. Accordingly, the hydraulic system 1 operates in a state where the overall efficiency, obtained as the product of the efficiency of the backup hydraulic pump 18, the efficiency of the electric motor 19, and the efficiency of the driver 21, is maximum.

Upon start of operation of the backup hydraulic pump 18, the pressure oil from the backup hydraulic pump 18 is supplied to one of the oil chambers (15a, 15b) of the actuator 14a via the control valve 17a. The oil is discharged from the other of the oil chambers (15a, 15b) and is then sucked in by the backup hydraulic pump 18 via the control valve 17a, and thus the pressure of the oil is raised. Further, switching between the oil chambers (15a, 15b) to which pressure oil is supplied and from which the oil is discharged is performed by switching the state of connection of the control valve 17a in accordance with a command signal from the actuator controller 11a, as a result of which the actuator 14a is operated to drive the elevator 103.

As described thus far, with the hydraulic system 1, even if a loss or reduction in the function of the aircraft central hydraulic power sources (104, 105) occurs, the actuator 14a can be driven by the pressure oil supplied from the backup hydraulic pump 18. On the other hand, electric power that is to be supplied to the electric motor 19 for driving the backup hydraulic pump 18 is supplied from the variable frequency supply 108 whose power-supply frequency changes with the change in the rotational speed of the power generation engine installed in the aircraft 100.

However, with the hydraulic system 1, the electric power from the variable frequency supply 108 is rectified by the power source unit 20, and moreover, the driver 21 drives the electric motor 19 so as to rotate the backup hydraulic pump 18 at a predetermined constant rotational speed (Nconst). Also, the predetermined constant rotational speed (Nconst) is set, based on the change in the efficiency of each of the backup hydraulic pump 18, the electric motor 19, and the driver 21 with respect to the rotational speed of the backup hydraulic pump 18, such that the overall efficiency, obtained as a product of multiplying these efficiencies, has a maximum value. This makes it possible to maintain the most efficient operational status of the hydraulic system 1 as a whole, including the backup hydraulic pump 18, the electric motor 19, and the driver 21, thus minimizing the energy loss caused by heat generation in the hydraulic system 1. Accordingly, it is possible to minimize the amount of heat generation in the hydraulic system 1, thus suppressing an increase in the overall temperature of the hydraulic system 1. As a result, it is also possible to suppress an increase in the temperature of the oil used in the hydraulic system 1.

Therefore, according to this embodiment, it is possible to provide a hydraulic system 1 for aircraft actuators that can drive the actuator 14a even in the case of a loss or reduction in the function of the aircraft central hydraulic power source (104, 105), and can suppress an increase in the overall temperature of the system and the temperature of the oil used.

Furthermore, with the hydraulic system 1, the hydraulic apparatus 13 that includes the electric motor 19, the backup hydraulic pump 18, and so forth is installed inside the tailplane 102. Accordingly, the hydraulic apparatus 13 is installed inside the tailplane 102, which is an area closer to the actuator 14a. This makes it possible to realize a reduction in size and weight of the hydraulic system 1 including the hydraulic apparatus 13, contributing to the weight reduction of the aircraft 100. Similarly, even if a hydraulic system is configured in correspondence with a control surface other than an elevator, it is also possible to realize a reduction in size and weight of the hydraulic system by similarly installing, inside the corresponding wing, a hydraulic apparatus included in the hydraulic system.

Although an embodiment of the present invention has been described thus far, the present invention is not limited to the above-described embodiment, and various modifications may be made within the scope recited in the claims. For example, it is possible to implement a hydraulic system for aircraft actuators that include an actuator for driving a control surface other than elevator, such as an aileron, and that supplies pressure oil to the actuator. Further, various modifications can be made for the configuration of the hydraulic circuit that connects the hydraulic system for aircraft actuators with the aircraft central hydraulic power sources. The graph shown as FIG. 4 for illustrating the efficiency of the hydraulic system is an example, and the present invention is not limited to this example. That is, the present invention can be implemented as long as the predetermined constant rotational speed when the driver rotationally drives the backup hydraulic pump is set, based on the change in the efficiency of each of the backup hydraulic pump, the electric motor, and the driver with respect to the rotational speed of the backup hydraulic pump, such that the overall efficiency, obtained as the product of these efficiencies, has a maximum value.

The present invention can be widely used as a hydraulic system for aircraft actuators that includes a hydraulically operated actuator for driving a control surface of an aircraft and that supplies pressure oil to the actuator. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. A hydraulic system for aircraft actuators that includes a hydraulically operated actuator for driving a control surface of an aircraft and that supplies pressure oil to the actuator, the actuator adapted to be operated by pressure oil supplied from an aircraft central hydraulic power source to drive the control surface, the system comprising:

a variable capacity backup hydraulic pump configured to supply pressure oil to the actuator when a loss or reduction occurs in a function of the aircraft central hydraulic power source;

an electric motor to drive the backup hydraulic pump;

a power source unit configured to rectify electric power supplied from a variable frequency supply, which is a generator whose power-supply frequency changes with a change in a rotational speed of a power generation engine installed in the aircraft;

a rotation angle sensor configured to detect a rotational speed of the electric motor; and a driver configured to receive a detection signal relating to the rotational speed of the electric motor detected by the rotation angle sensor and control electric power supplied from the power source unit, and to supply electric power to the electric motor to be rotated at a predetermined constant rotational speed in accordance with the detection signal, and to drive the electric motor so as to rotate the backup hydraulic pump in synchronization with the electric motor at a predetermined constant rotational speed, wherein the predetermined constant rotational speed of the backup hydraulic pump is set, based on a change in an efficiency of each of the backup hydraulic pump, the electric motor, and the driver with respect to the rotational speed of the backup hydraulic pump, such that an overall efficiency, obtained as a product of multiplying the efficiency of the backup hydraulic pump, the efficiency of the electric motor and the efficiency of the driver, has a maximum value.

* * * * *